United States Patent [19]
Conrads et al.

[11] Patent Number: 6,047,731
[45] Date of Patent: Apr. 11, 2000

[54] PRESSURE FITTING, IN PARTICULAR A PRESSURE RELIEF AND SAFETY VALVE

[75] Inventors: Hermann-Josef Conrads, Herzogenaurach; Erwin Laurer, Moehrendorf; Juergen Model; Ullrich Preiss, both of Erlangen, all of Germany

[73] Assignee: Siemens Aktiengesellschaft, Munich, Germany

[21] Appl. No.: 08/750,545

[22] PCT Filed: May 24, 1995

[86] PCT No.: PCT/DE95/00678

§ 371 Date: Mar. 21, 1997

§ 102(e) Date: Mar. 21, 1997

[87] PCT Pub. No.: WO95/33152

PCT Pub. Date: Dec. 7, 1995

[30] Foreign Application Priority Data

May 27, 1994 [DE] Germany ............................. 44 18 660

[51] Int. Cl.[7] .................................................. F16K 17/04
[52] U.S. Cl. ......................................... 137/624.27; 251/66
[58] Field of Search ........................ 137/624.27; 251/89, 251/107, 111, 114, 101, 102, 103, 66

[56] References Cited

U.S. PATENT DOCUMENTS 2,030,143  2/1936  Giger-Knüsli .
4,043,351  8/1977  Durling .......................... 137/624.27 X
4,625,762  12/1986  Hassanzadeh et al. ............ 137/624.27

FOREIGN PATENT DOCUMENTS 0124821  11/1984  European Pat. Off. .
597161  8/1933  Germany .
2017742  12/1971  Germany .
2150317  4/1980  Germany .
199541  6/1923  United Kingdom .
808577  2/1959  United Kingdom .
1080063  8/1967  United Kingdom .
1228827  4/1971  United Kingdom .............. 137/624.27

*Primary Examiner*—Kevin Lee
*Attorney, Agent, or Firm*—Herbert L. Lerner; Laurence A. Greenberg

[57] ABSTRACT

The invention relates to a pressure fitting (1) having a flow channel (42), a valve cone (5), a sliding element (43), and a locking device (12). The sliding element (43) is disposed displaceably along a main axis (41) of the pressure fitting (1). The valve cone is disposed on one end (44) of the sliding element (43). The flow channel (42) is closable by the valve cone (5) and the locking device (12) can be moved into a locking position, so that in a position of the valve cone (5) that opens the flow channel (42) the locking device (12) engages the valve cone (5) and/or the sliding element (42) and keeps the valve cone (5) in the position that opens the flow channel (42). Thereby a pressure relief in a pressurized system, in particular in a pressurizer (47) of a pressurized water reactor, can be assured even to a pressureless state. The pressure fitting is particular useful as a pressure relief valve or as a combined pressure relief and safety valve.

26 Claims, 4 Drawing Sheets

PRESSURE FITTING, IN PARTICULAR A PRESSURE RELIEF AND SAFETY VALVE

BACKGROUND OF THE INVENTION

Field of the Invention

The invention relates to a pressure fitting with a flow channel, a valve cone, a sliding element, and a locking device, wherein a) the sliding element is disposed displaceably along a main axis of the pressure fitting;
b) the valve cone is disposed on one end of the sliding element;
c) the flow channel is closable by the valve cone;
d) the locking element can be moved into a locking position, so that in a position of the valve cone that opens the flow channel the locking device engages the valve cone and/or the sliding element and keeps the valve cone in the position that opens the flow channel.

In all fields in technology in which containers or pipes are under pressure, pressure fittings are used, especially for pressure relief and pressure control. Pressure relief or pressure control can be accomplished both during normal operation and for safety of a system with components that are under pressure. Pressure vessels especially, under existing technical rules, must frequently be secured against overpressure. Moreover, in a pressure vessel, especially a steam boiler, the possibility of a pressure relief, even one to be initiated by hand, is demanded. By means of timely and sufficient pressure relief, the performance of flexible safety provisions can be improved. This is especially advantageous in a nuclear power plant with a primary system that is under pressure and that has components to be protected, such as the reactor core. A pressure relief of a pressure vessel which is under high internal pressure, an example being a nuclear reactor pressure vessel with an internal pressure of about 150 bar, to a pressure on the order of magnitude of an ambient pressure, of 2 to 4 bar, for instance, or to a pressureless state must be provided for, depending on the design specifications.

A safety valve for sealing off a hydraulic system that is under elevated pressure is described in British Patents GB 199 541 and GB 808 577. The safety valve is designed such that if a critical pressure is exceeded, a pressure reduction can be carried out. A common feature of both patents is that a structural embodiment of the safety valve is described in which by displacement of a locking element along an axis at right angles to the direction of the stroke of the valve piston of the safety valve, a locking of the valve cone in the position that opens the safety valve is attained. After an opening of the safety valve in accordance with specifications, or in other words after a critical pressure inside the hydraulic system is exceeded, the safety valve can be kept open down to a lower system pressure.

The locking element described in GB 808 577 is a ball, which is pressed into a groove of the valve piston via a piston that is prestressed by a spring. The piston that displaces the ball may be returned to its outset position either by a manually operated device or optionally by an electromagnetic device. In all cases, the locking element is embodied such that every time the safety valve opens, this safety valve is automatically kept open. Remote control of the locking arrangement is limited merely to returning the locking element or in other words re-stressing the spring.

The locking element described in GB 199 541 has two pins, disposed on opposite sides of a valve piston, which each engage a groove extending in the valve piston. The pins are pressed against the valve piston via a prestressed spring, so that force-locking engagement with the valve piston exists, preventing the piston from moving in its lift direction. If the pressure in the hydraulic system is so that both the frictional force of the pins and the force of the closing spring are overcome, then the piston is moved in the reciprocating direction. As soon as the respective grooves in the valve piston have reached the level of the pins, the pins are automatically pressed into the grooves in a manner that is not controllable from outside. Locking of the valve piston in a position that opens the valve is thereby attained. The prestressing of the springs of the pins can be regulated in such a way that at various system pressures, re-closing of the valve as a consequence of the closing force of the valve spring is attained.

Both GB 808 577 and GB 199 541 are limited solely to keeping a safety valve open with locking elements, which are moved along an axis at right angles to the reciprocating direction of the valve piston and which are put by a prestressed spring, without the possibility of influence (control) from outside, each time the valve opens into a position such that the valve piston remains in a position that opens the valve.

GB 808 577 discloses a fitting that includes a locking device. This device can be undone again only manually. German Patent Disclosure DE 597 161 discloses a fitting that can be locked with the aid of a pawl. The pawl is pressed into the closing position by a spring.

In those prior art fittings, the moving parts are powerfully accelerated and braked. This can be ascribed to the fact that they are not moved until there is a relatively high fluid pressure and are then locked abruptly.

SUMMARY OF THE INVENTION

The object of the invention was to disclose a pressure fitting that even at a slight pressure and in a pressureless state is movable and can be held in an opened position.

This object is attained in accordance with a first embodiment of the invention in that the sliding element has a piston, which can be guided in a guide and has means for an engagement of the locking element; that the locking element has at least one locking pawl that is pivotable about a pivot point; and that a damping chamber is disposed between the piston and the guide.

Once the flow channel has opened, the grip and hold of the valve cone assure that the flow channel remains open upon a pressure relief, even if the pressure relief results in a pressureless state. The valve cone is securely held in a position that opens the flow channel by the locking device. This is especially advantageous for a nuclear reactor pressure vessel, since a pressure relief down to a very low pressure can thus be carried out, making it simpler to perform safety measures, especially cooling of the reactor core, to protect the reactor core. Even in an extremely unlikely case of a meltdown of the nuclear reactor, an effective pressure reduction to a low pressure is assured, so that all the safety measures can be employed without problems and effectively. Moreover, a pressure relief operation can be initiated and carried out with the pressure fitting in a controlled manner, optionally by hand.

The damping chamber prevents a hard impact of the valve cone and the piston when the valve cone takes its seat as the pressure fitting closes. The damping chamber also slows down the motion of the piston upon opening of the pressure fitting, especially because the pressure increase occurs only gradually. This also lessens mechanical strain on the pressure fitting caused by any collision of components.

In a second embodiment of the invention, the object is attained in that a control device is provided, with which the locking device is movable under control into the locking position and out of that position into a free position, in which the valve cone is again freely displaceable.

Regardless of a pressure prevailing in the interior of the pressure fitting, it can thus be attained that a pressure relief can be carried out by means of the pressure fitting at any time. Moreover, closure of the fitting is assured regardless of an internal pressure in the pressure fitting. It is also assured that the fitting can be kept open for a pressure relief down to a pressureless state.

The piston that can be guided in a guide can also be disposed outside the flow channel; this prevents structural influence of the flow channel and assures an effective mode of operation of the pressure fitting. The locking pawl can be mounted in a simple way in the pressure fitting and can move simply into the locking position and out of it by rotation about a pivot point, for instance. It may be embodied as a simple mechanical element, which is reliably functional even at a high pressure and a high temperature. Depending on the operating conditions required, it may be manufactured from a suitable material, such as a stainless steel. For motion into the locking position, a compression spring may be provided. For reliable locking of the valve cone, it may also be advantageous to provide a plurality of locking pawls.

The piston preferably has a groove for engagement by the locking pawl. Mechanical engagement of the groove by the locking pawl can be carried out reliably even at a high pressure and temperature, so that opening of the pressure fitting, and keeping it open, is assured in every case.

The control valve can preferably be operated via a motor. The motor may be switched under remote control to bring about a controlled pressure relief.

Preferably, the motor drives a tappet, which particularly via a switching sheath moves the locking device into and out of the locking position. When the tappet is released under the control of the motor, the locking device is moved into the locking position. A contrary motion of the tappet moves the locking device back out of the locking position.

Advantageously, the control valve may be driven via two mutually independent motors. This makes it possible for each of the motors to be checked and possible replaced independently of the other one during operation. This is because only a single motor needs to be functional for opening, holding open, or closing the pressure fitting. This not only increases the safety of a plant with components that are under pressure, but a redundant embodiment also makes maintenance easier and lessens the likelihood of malfunction of the pressure fitting.

Preferably, an opening and a closing of the flow channel can be carried out, particularly for a pressure relief, via the control device. Such an opening and closing of the flow channel, or in other words a corresponding motion of the valve cone, is preferably controlled via at least one relief channel, which communicates with the pressure fitting and is closable by a control valve cone of the control valve. An opening of the relief channel causes a motion of the valve cone that opens the flow channel, and closing of the relief channel causes a closing motion.

Preferably, the pressure fitting operates by the relief principle in which with the flow channel closed, a pressure can be brought to bear upstream of the valve cone, which pressure is reducible in the interior of the pressure fitting, by which means a motion of the valve cone that opens the flow channel is generated. In the closing position of the pressure fitting, for instance, the pressure of a system that is under pressure and is to be relieved may prevail in the interior of the pressure fitting. In particular, a force is exerted on the valve cone via the piston so that the valve cone closes the flow channel. The force may be generated both via the pressure and via an additional spring force. If the pressure in the interior of the pressure fitting decreases, the force on the valve cone or piston decreases, and a lifting force caused by the pressure and engaging the underside of the piston increases, which leads to a motion of the valve cone or piston that opens the flow channel. Upon a closure of the relief channel, a new pressure buildup takes place in the interior of the pressure fitting, so that the force acting on the valve cone or the piston increases, resulting in a re-closure of the flow channel.

Preferably, the pressure fitting has a control valve which is internally drivable with system-internal medium, which if a critical pressure in the interior of the pressure fitting is exceeded causes an opening of the flow channel, and if the pressure is below the critical pressure effects a reclosure of the flow channel. The control valve may be a spring valve, which communicates with the interior of the pressure fitting via a further relief channel. If the pressure in the interior of the pressure fitting rises, then the pressure applied to the internally drivable control valve rises as well. If that pressure reaches a critical value, which leads to a force that exceeds the spring force, the result is opening of the control valve. Hence a pressure relief of the interior of the pressure fitting takes place, as a result of which an opening of the flow channel is attained and thus a pressure relief of the pressurized system is accomplished. If the pressure in the interior of the pressure fitting drops, the force exerted on the control valve drops, so that beyond a certain pressure value the control valve closes again the result of which is again a re-closure of the pressure fitting. Any further pressure relief of the pressurized system is thus prevented. The pressure fitting is accordingly suitable as a safety valve for a pressurized system, as well, especially for a pressure vessel of a pressurized water reactor.

Preferably, the valve cone in the downstream direction is approximately onion-shaped. Together with a suitable shape of the flow channel, this allows an especially favorable flow guidance and hence an especially compact embodiment of the pressure fitting. The valve cone is preferably embodied elastically in the manner of onion peels, which assures particularly good seat tightness, even when the geometry of the valve seat, on which the valve cone in the flow cone rests, is thermally or mechanically deformed. The especially compact embodiment thus attained is thus not only economical but also has a positive effect on the dynamics on the pressure fitting, especially because the masses to be moved are smaller and hence lesser forces arise. Moreover, lesser impact strains, particular on the valve cone, occur, and simpler holding of the pressure fitting is possible.

Preferably, a throttle channel is provided in the guide, connecting the damping chamber with the flow channel. This assures that a medium, such as water steam, located in the flow channel will flow in throttled fashion into the damping chamber. Only a gradual pressure rise thus occurs in the damping chamber upon opening of the pressure fitting. This slows down a motion of the piston, especially an upward motion along the main axis of the pressure fitting. The danger of excessive mechanical strain on the pressure fitting is thus further reduced.

For closure of the pressure fitting from a position that opens the flow channel, and especially for re-closure, the pressure fitting preferably has a control chamber, which is located on the side of the piston opposite the valve cone and communicates with the flow channel via a throttle channel. The control chamber can be pressure-relieved via a relief channel, which can be opened and closed via an externally driven control valve for instance. Once the relief channel is closed, the control chamber is filled with medium from the flow channel via the throttle channel. This causes a pressure buildup inside the control chamber, and the piston is moved hydraulically along the main axis, particularly downward, if the locking element is held outside its locking position, for instance via the externally drivable control valve. The valve cone is thus brought to a position that closes the flow channel. If the flow channel is already closed, then the medium located in the controlled chamber keeps it closed.

A use of the pressure fitting in the form of a pressure relief valve for a pressure vessel of a nuclear reactor, in particular in a pressurized water reactor is especially advantageous, since with the pressure fitting, a pressure relief of the pressure vessel down to a low pressure, in particular approximately 2 to 4 bar or less, is assured.

The pressure fitting is also suitable for use as a combined pressure relief and safety valve for a pressure vessel of a nuclear reactor, in particular in a pressurized water reactor. The term "pressure relief" is understood here to mean the lowering of the pressure in the interior of a pressure vessel to below the normal operating pressure, and "safety" is understood to mean securing a pressure vessel, which is under internal pressure, against overpressure. A combined pressure relief and safety valve thus has both properties, namely of opening if a critical pressure is exceeded and thus reducing any further dangerous pressure rise, and upon a corresponding demand, by opening, of reducing the internal pressure inside the vessel to a desired amount, and in particular to the ambient pressure. Via the externally drivable control valve, a pressure relief is possible regardless of the pressure prevailing in the interior of the pressure fitting. Because of the locking element, a pressure relief down to a very low pressure, even to a pressureless state, is made possible. This is advantageous for instance when the pressure vessel is inspected. Via the externally drivable control valve, a re-closure of the pressure fitting can also be carried out. To that end, if necessary, the locking element is moved back out of its locking position. By means of the internally drivable control valve, in particular a spring valve, the pressure fitting moreover performs the function of a safety valve. The pressure fitting thus represents an especially compact combined pressure relief and safety valve, which can be kept open down to a pressureless state.

Preferably, the pressure fitting is used as a combined pressure relief and safety valve for a pressurizer of a pressurized water reactor.

The pressure fitting will be described in further detail in conjunction with the drawing. The various drawing figures, each in a longitudinal section, show the following:

DESCRIPTION OF THE PREFERRED EMBODIMENT

Figure 1:
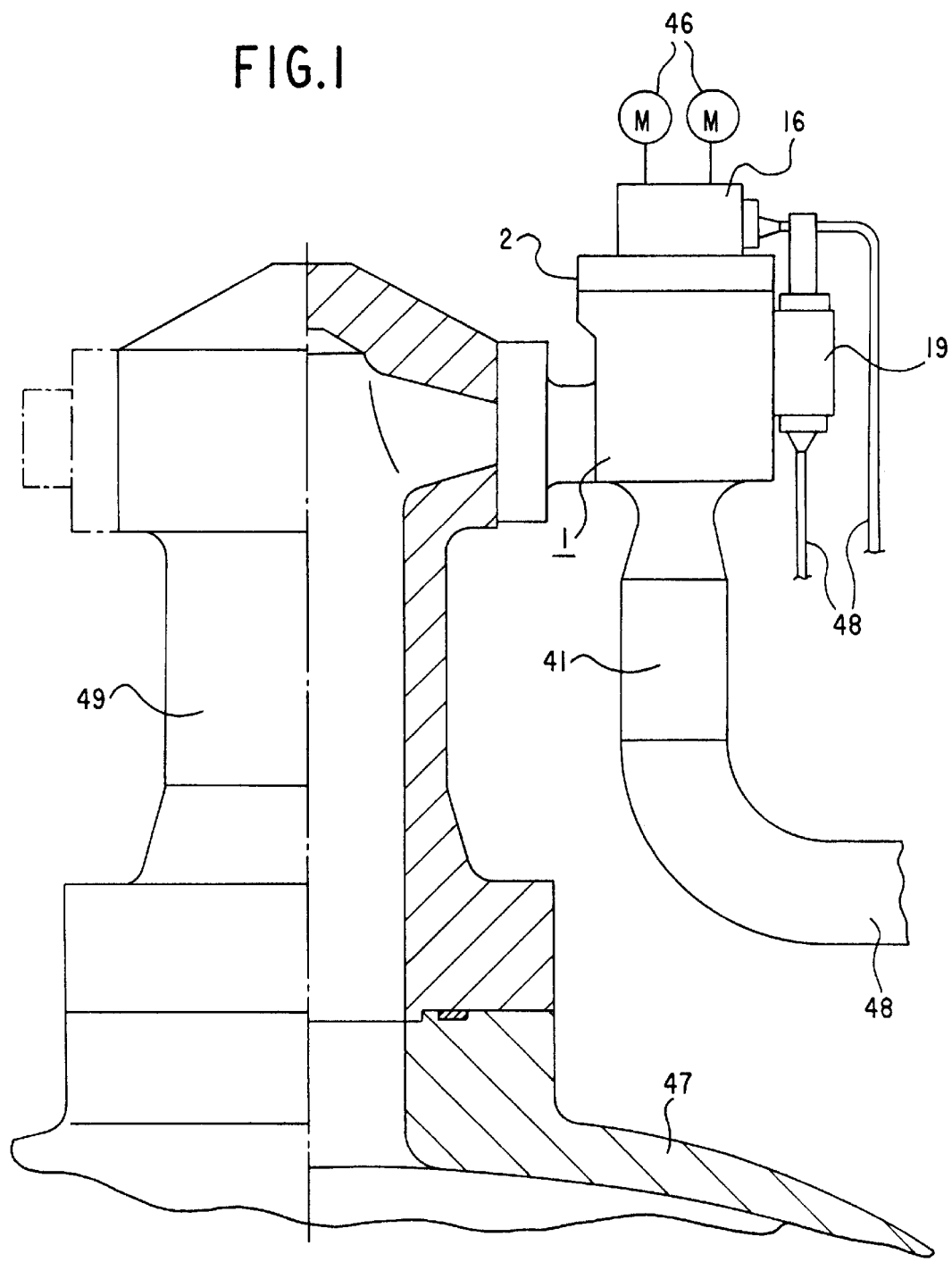
FIG. 1, a pressure fitting, which is connected to a pressure vessel.

Each of the drawing figures shows only those components of the pressure fitting essential for purposes of explanation.

In FIG. 1, a pressure fitting 1 is shown, which is shown on a dome attachment 49 of a pressurizer 47, for instance of a pressurized water reactor. Adjoining it under the pressure fitting 1 is a pressure relief pipe 48 along a main axis 41 of the pressure fitting 1. An externally drivable control valve 16 with two motors 46 is disposed on a lid 2 of the pressure fitting 1. A further pressure relief pipe 48 extends away from the control valve 16. On a side of the pressure fitting 1 opposite the dome attachment 49, an internally drivable control valve 19, which is a spring valve and likewise has a pressure relief pipe 48, is provided.

Figure 2:
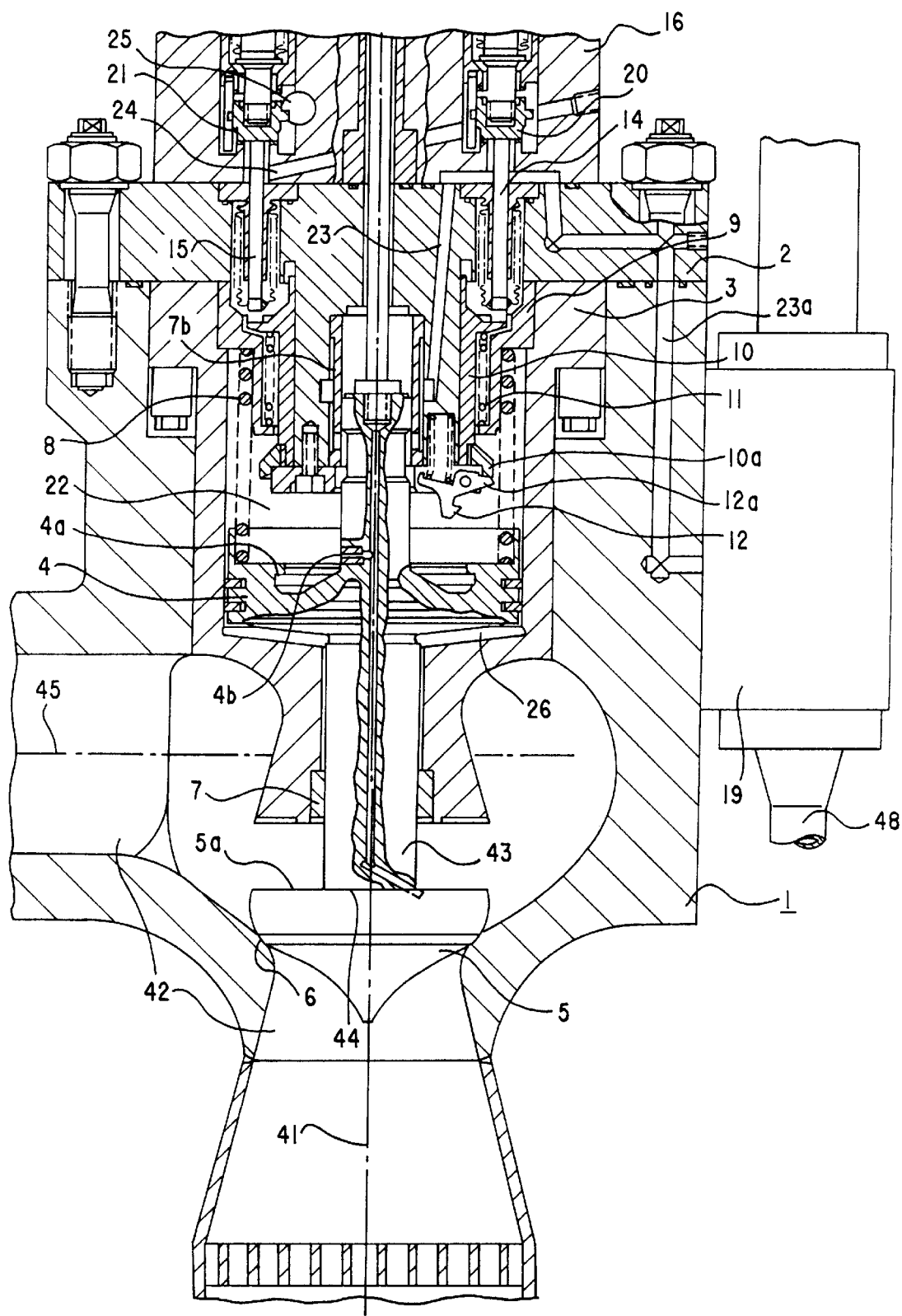
FIG. 2, an enlarged view of the pressure fitting in the closed state.

FIG. 2 shows a section through the pressure fitting in the closed state. The pressure fitting 1 has a flow channel 42, which extends along an axis 45 into the pressure fitting 1 and leads out of the pressure fitting along the main axis 41. A valve cone 5 of the pressure fitting 1 is disposed on one end 44 of a sliding element 43, which is a piston rod. The sliding element 43 and hence the valve cone 5 as well are displaceable along the main axis 41. The valve cone 5 is seated on a valve seat 6 and closes off the flow channel 42 in the direction of the main axis 41. The main axis 41 and the axis 45 of the incoming flow channel 42 are perpendicular to one another. In the portion of the flow channel 42 that extends parallel to the axis 45, or in other words the horizontal portion, a pressurized medium, such as saturated steam, is present. In the region of the flow channel 42 that extends parallel to the main axis 41, or in other words vertically, a lesser pressure prevails. The valve cone 5, with its upper side 5a, faces toward a guide 7 of the sliding element 43.

Above the flow channel 42, the sliding element 43 has a piston 4, which is guided in a guide cylinder 3 and is sealed off from it by piston rings, not identified by reference numerals.

The piston 4 thus divides the interior of the pressure fitting 1 into a cylindrical damping chamber 26, located below the piston 4 and oriented toward the valve cone 5, and a control chamber 22 that is located above the piston 4. A locking device 12, which is a locking pawl, is rotationally movably disposed about a pivot point inside the control chamber 22. The piston 4 is pressed downward, that is, in the direction of the valve cone 5, by a valve spring 8. The locking pawl is kept out of the locking position via a switching sheath 10. A spring 11 of the switching sheath 10 is held in a spring carrier 9 and exerts an upward-directed force upon the switching sheath 10. Counter to this force, the switching sheath 10 is kept in its position via tappets 14, 15. The tappets 14, 15 are in turn held via respective control valve cones 20, 21 of the motor-driven control valve 16. From the control chamber 22, a pressure relief channel 23, 23a leads away in one direction to the motor-driven control valve 16 and in the other to the internally drivable control valve 19, that is, the spring valve. Other pressure relief channels 24, 25 connect the control chamber 22 to the motor-driven control valve 16.

On its side toward the locking pawl 12, the piston 4 has an encompassing collar, embodied as a groove 4a, which can be engaged by the locking pawl 12 in its locking position. The pressure fitting 1 is in its normal operating state; that is, both the spring valve 19 and the two control valve cones 20, 21 of the motor-drivable control valve 16 are closed. The valve cone 5 is also located on its valve seat 6 and closes off the flow channel 42. The control valve cones 20, 21, via the tappets 14, 15, press the switching sheath 10 downward counter to the force of the spring 11. As a result, the lower end 10a of the switching sheath 10 is pressed against a cam 12a of the locking pawl 12, which in turn is moved out of the region of the groove 4a of the piston 4. In this position of the locking pawl 12, the pressure fitting 1 can be used as a safety valve unrestrictedly for pressure relief and pressure securing.

Figure 3:
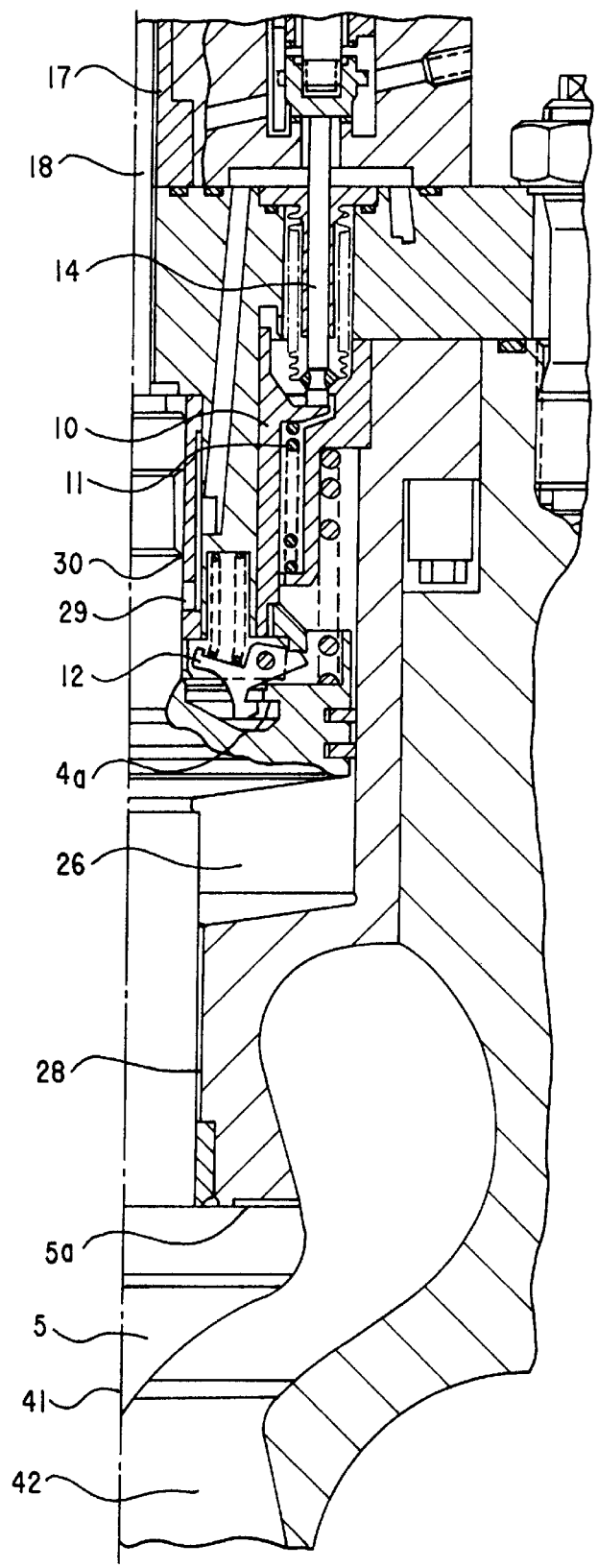
FIG. 3, an enlarged view of the pressure fitting in the open state.

In FIG. 3, the pressure fitting 1 is shown in the open state in its function as a pressure securing or safety valve. At a critical system pressure, such as 176 bar, the spring valve 19 has relieved the pressure of the control chamber 22 of the pressure fitting 1 via the relief channel 23, 23a to such an extent that the valve cone 5 has reached a position that opens the flow channel 42. The valve cone 5 rests with its top side 5a against the guide 7. In accordance with the motion of the valve cone 5, the piston 4 has been moved upward as well. It is located in the immediate vicinity of the locking pawl 12, but without engagement by the pawl of the intended groove 4a of the piston 4. The switching sheath 10 with its spring 11 is held by the tappet 14 in such a way that it keeps the locking pawl 12 out of the locking position. The damping chamber 26 between the piston 4 and the guide 7 is at its maximum size in this position. It is sealed off from the control chamber 22 by the piston 4, and it communicates with the flow channel 42 via a throttle gap 28, which extends parallel to the main axis 41 between the sliding element 43 and the guide 7. Both in an opening motion of the piston 4 and a closing motion of the piston 4, the damping chamber 26 causes a corresponding slowing of the motion of the piston 4. Upon a pressure reduction in the control chamber 22, the piston 4 is moved upward counter to the closing force, which is generated in particular via the valve spring 8 and the pressure in the control chamber 22, in response to an imposition of pressure on the damping chamber 26. To avoid an overly rapid opening motion and hence a strong dynamic load, throttling of the pressure relief of the control chamber 22 is provided. This is attained in part by the damping chamber 26, which increases in size steadily upon an upward motion of the piston, but in which a pressure buildup occurs only in delayed fashion because of the throttle gap 28. Throttling of the pressure relief of the control chamber 22 is moreover attained by the fact that the sliding element 43 has a control edge 30 above the piston 4. This control edge 30, beyond a predetermined stroke of the piston 4, closes a pressure relief opening 29 in an upper guide 7b surrounding the sliding element 43, and as a result the pressure relief is lessened. If the piston 4 has assumed a top terminal position, that is, if the valve cone 5 rests with its top side 5a on the guide 7, then a pressure equalization takes place between the damping chamber 26 and the flow channel 42.

In a closing operation of the pressure fitting 1, an additional hydraulic force acts on the annular top side 5a of the valve cone 5. An acceleration of the valve cone 5 by this hydraulic force can likewise be prevented by the damping chamber 26, since the medium located in the damping chamber 26 must flow through the likewise annular throttle gap 28 into the flow channel 42. Upon a rapid downward motion of the piston 4, the medium is thus unable to flow unhindered out of the damping chamber 26, so that a compression of the medium and hence an increase in pressure takes place in the damping chamber 26. This pressure increase counteracts the downward motion of the piston 4 and slows down the closing operation of the pressure fitting 1. This largely prevents a hard impact of the valve cone 5 as it meets its seat 6.

The closing operation of the pressure fitting 1 begins as soon as the spring valve 19 closes again in response to a dropping pressure, for instance to below about 150 bar. This terminates any further relief of the pressure fitting 1, and particularly of the control chamber 22. Via the throttle channel 4b, medium flows out of the flow channel 42 into the control chamber 22 to replenish it and causes a corresponding pressure imposition on the piston 4. This produces a re-closure of the pressure fitting 1, without hindrance from the locking device 12. The pressure fitting 1 thus acts as a pressure securing or safety valve.

Figure 4:
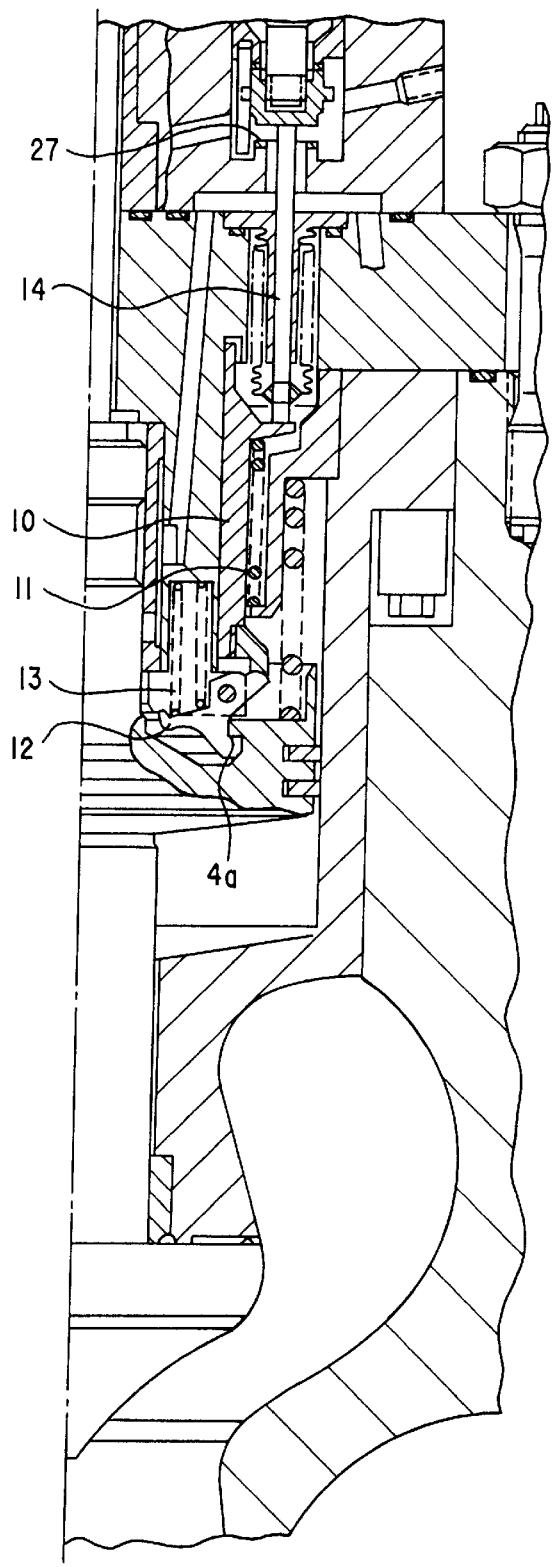
FIG. 4, an enlarged view of the pressure fitting in the open state.

In FIG. 4, the pressure fitting 1 is shown in the open state in its function as a pressure relief valve. To illustrate the engagement of the locking pawl 12 with the groove 4a of the piston 4, only a portion of the pressure fitting between the main axis 41 and the spring valve 19 is shown. Via the respective motors 46 (see FIG. 1), the control valve cones 20, 21 have been moved out of their respective seat 27 so that via the relief channels 23, 24 and 25, a pressure relief of the control chamber 22 has taken place. Both the piston 4 and the valve cone 5 have thus been moved hydraulically upward, that is, away from the valve seat 6. The switching sheath 10 and the tappets 14, 15 have also been moved upward by the spring 11, so that the locking pawl 12 has been rotated into the locking position by a compression spring 13. The pawl engages the groove 4a, which is the encompassing collar of the piston 4, and retains the piston, should it drop, in a position that opens the flow channel.

With the motor-drivable control valve 16 open and with adequately high pressure in the damping chamber 26, the valve cone 5 and the piston 4 remain in the position shown, which opens the flow channel. If the pressure drops below a minimum value, then the piston 4 begins to move downward both by the weight of the sliding element 43 and by the force exerted by the valve spring 8. This motion, and the corresponding forces, are absorbed by the locking pawl 12, and both the piston 4 and the valve cone 5 are held securely in the position that opens the flow channel. To that end, it is also possible for a plurality of locking pawls to be provided.

Functional testing of the pressure fitting 1 during operation of the pressurized system, especially a nuclear reactor pressure vessel, can be carried out in a simple way, for instance at a reduced pressure of about 40 bar, when the system is put online or taken offline. Opening of the motor-drivable control valve 16 leads to a hydraulic opening of the pressure fitting 1 and a motion of the locking pawl or pawls 12 into the locking position. A position indication of the piston 4 is provided via a position indicator rod 18, which is guided in a thimble tube 17 and is connected with the sliding element 43 along the main axis 41. If in an ensuing re-closing operation one of the two control valve cones 20, 21 fails to reach its valve seat 21 or remains entirely open, closure of the pressure fitting 1 takes place nevertheless. This is because a single closing control valve cone 20, 21 moves the locking pawl 12 out of the groove 4a and causes a closure of the relief channels 23, 24, 25, resulting in a hydraulic closure of the pressure fitting 1. Replacement of a defective motor 46 of the motor-drivable control valve 16 is thus possible even during operation of the system, which in particular is a nuclear reactor, without having to shut down the system. By moving the control valve cones 20, 21 in alternation out of their respective valve seat 27, the functional capability of the motor-drivable control valve 16 can be checked even during full-load operation of the system, without causing the flow channel 42 to open. The locking pawls 12 remains in such a test always out of the locking position, so that the pressure fitting 1 remains constantly ready for use as a pressure securing valve during the test.

The invention is distinguished by the fact that with a single, extremely compact pressure fitting, a combined pressure relief and safety valve is provided, which assures a pressure relief down to a pressureless state. A closing motion of the valve cone is reliably prevented via a locking device, especially a locking pawl; the locking device engages a sliding element and thus holds the valve cone firmly in a position that opens the flow channel. By means of an externally drivable control valve with at least two mutually independent motors, checking of this control valve can be done even during operation of a pressurized system. The pressure fitting is especially suitable as a combined pressure relief and safety valve for a pressurizer of a pressurized water reactor.

We claim:

1. A pressure fitting with a flow channel, comprising:
   a sliding element disposed displaceably along a main axis of the pressure fitting, said sliding element having an end;
   a valve cone disposed on said end of said sliding element, said valve cone being selectively movable between an open valve position in which a flow channel of the pressure fitting is open, and a closed valve position in which the flow channel is closed;
   a locking element engaging said sliding element in an open valve position of said valve cone, for maintaining the open valve position;
   a guide slidably guiding said sliding element, said sliding element including a piston adapted to be engaged by said locking element; and
   said locking element having at least one locking pawl being pivotable about a pivot point; and said piston and said guide enclosing a damping chamber therebetween.

2. The pressure fitting according to claim 1, which operates by relief principle, wherein, in the closed valve position, a pressure can be brought to bear upstream of said valve cone, which pressure is reducible in an interior of said pressure fitting, whereby said valve cone is moved towards the open valve position.

3. The pressure fitting according to claim 2, which further comprises an internally drivable control valve, said control valve opening said flow channel when a critical pressure in the interior of the pressure fitting is exceeded, and said control valve closing said flow channel when the pressure falls below the critical pressure.

4. The pressure fitting according to claim 1, wherein said valve cone is approximately onion-shaped in a direction opposite a flow through the flow channel.

5. The pressure fitting according to claim 1, wherein said piston has a groove formed therein for engagement by said at least one locking pawl.

6. The pressure fitting according to claim 1, wherein said piston and a lower region of said guide define a damping chamber therebetween.

7. The pressure fitting according to claim 6, wherein said guide has a throttle conduit formed therein, said throttle conduit connecting said damping chamber with said flow channel.

8. The pressure fitting according to claim 1, wherein a control chamber formed on a side of said piston opposite said valve cone, said control chamber communicating with said flow channel via a throttle conduit.

9. The pressure fitting according to claim 1, wherein the pressure fitting is a pressure relief valve for a pressure vessel of a nuclear reactor.

10. The pressure fitting according to claim 9, wherein the nuclear reactor is a pressurized water reactor.

11. The pressure fitting according to claim 1, wherein the pressure fitting is a combined pressure relief valve and safety valve for a pressure vessel of a nuclear reactor.

12. The pressure fitting according to claim 1, wherein the pressure fitting is a combined pressure relief valve and safety valve for a pressurizer of a pressurized water reactor.

13. A pressure fitting with a flow channel, comprising:
    a sliding element disposed displaceably along a main axis of the pressure fitting, said sliding element having an end;
    a valve cone disposed on said end of said sliding element, said valve cone being selectively movable between an open valve position in which a flow channel of the pressure fitting open, and a closed valve position in which the flow channel is closed; a locking element engaging said sliding element in an open valve position of said valve cone, for maintaining the open valve position; and
    a control device operatively connected with said locking element, said control device moving said locking element between a catch position in which said locking element maintains the open valve position and a free position, in which the valve cone is freely displaceable.

14. The pressure fitting according to claim 13, wherein said control device is a control valve, and including at least one motor driving said control valve.

15. The pressure fitting according to claim 14, which further comprises a tappet connected to said locking element, said at least one motor driving said tappet for moving said locking element into and out of the catch position.

16. The pressure fitting according to claim 15, which further comprises a switching sheath disposed between said locking element and said tappet.

17. The pressure fitting according to claim 14, wherein said at least one motor is one of two mutually independent motors, and said control valve is drivable via said two independent motors.

18. The pressure fitting according to claim 13, wherein said control device is a control valve drivable with external medium.

19. The pressure fitting according to claim 13, wherein said control device causes an opening and a closing, respectively, of the flow channel for a pressure relief operation.

20. The pressure fitting according to claim 13, which operates by relief principle, wherein, in the closed valve position, a pressure can be brought to bear upstream of said valve cone, which pressure is reducible in an interior of said pressure fitting, whereby said valve cone is moved towards the open valve position.

21. The pressure fitting according to claim 20, which further comprises an internally drivable control valve, said control valve opening said flow channel when a critical pressure in the interior of the pressure fitting is exceeded, and said control valve closing said flow channel when the pressure falls below the critical pressure.

22. The pressure fitting according to claim 13, wherein said valve cone is approximately onion-shaped in a direction opposite a flow through the flow channel.

23. The pressure fitting according to claim 13, wherein the pressure fitting is a pressure relief valve for a pressure vessel of a nuclear reactor.

24. The pressure fitting according to claim 23, wherein, the nuclear reactor is a pressurized water reactor.

25. The pressure fitting according to claim 13, wherein the pressure fitting is a combined pressure relief valve and safety valve for a pressure vessel of a nuclear reactor.

26. The pressure fitting according to claim 13, wherein the pressure fitting is a combined pressure relief valve and safety valve for a pressurizer of a pressurized water reactor.

* * * * *